United States Patent [19]
Lashar, Jr.

[11] 3,739,571

[45] June 19, 1973

[54] LAMINATED CHAIN LINK CONSTRUCTION

[75] Inventor: Walter B. Lashar, Jr., York, Pa.

[73] Assignee: American Chain & Cable Company, Inc., New York, N.Y.

[22] Filed: May 4, 1971

[21] Appl. No.: 140,224

[52] U.S. Cl. .................................. 59/84, 59/91
[51] Int. Cl. .......................................... F16g 15/12
[58] Field of Search ............... 59/84, 78, 90, 91, 59/13, 35, 82, 84, 1

[56] References Cited
UNITED STATES PATENTS

| | | | |
|---|---|---|---|
| 3,055,168 | 9/1962 | Towry | 59/84 |
| 857,449 | 6/1907 | Currie | 59/84 |
| 1,542,490 | 6/1925 | Clark | 59/91 |
| 3,237,396 | 3/1966 | Brugnola | 59/85 |
| 729,611 | 6/1903 | Lane | 59/84 |

FOREIGN PATENTS OR APPLICATIONS 1,048,178  7/1953  France .................................. 59/85

Primary Examiner—Charles W. Lanham
Assistant Examiner—Gene P. Crosby
Attorney—Pennie, Edmonds, Morton, Taylor & Adams

[57] ABSTRACT

A chain link having multiple layers joined together to form a composite laminated link. Each layer of the link has two J-shaped link plates joined together at their ends to form the various layers of the link with the joints between the link plates of each layer arranged in offset relationship with respect to each other, thereby minimizing cross-sectional variation in the strength of the link. A plurality of these links can be attached end to end to form a chain or combined with alternate links made of solid layers.

10 Claims, 8 Drawing Figures

PATENTED JUN 19 1973

INVENTOR
Walter B. Lashar, Jr.
BY
ATTORNEYS

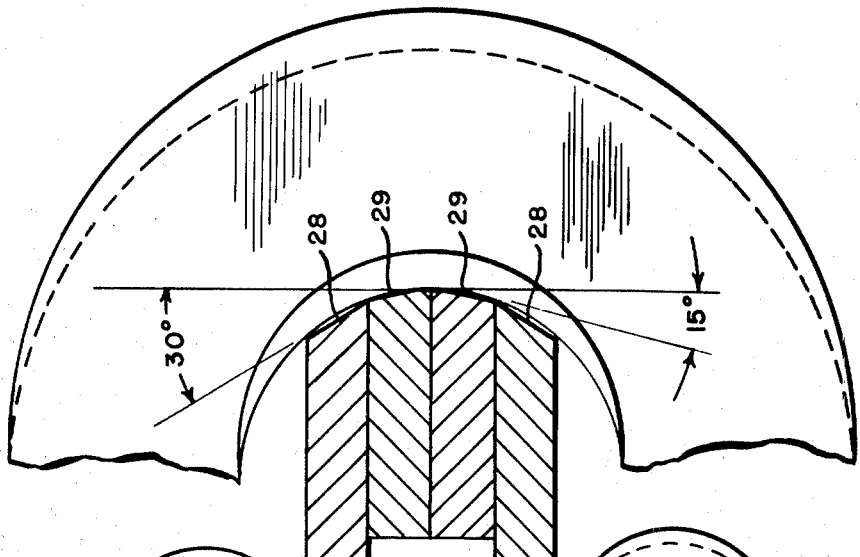
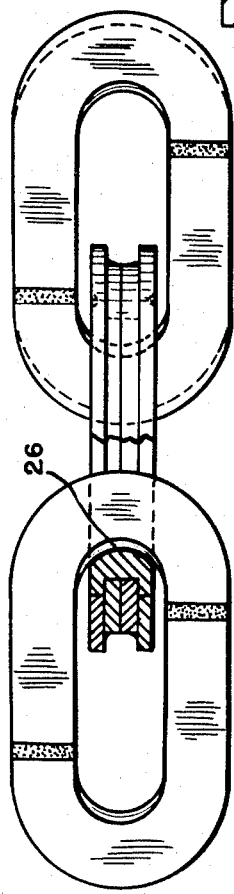
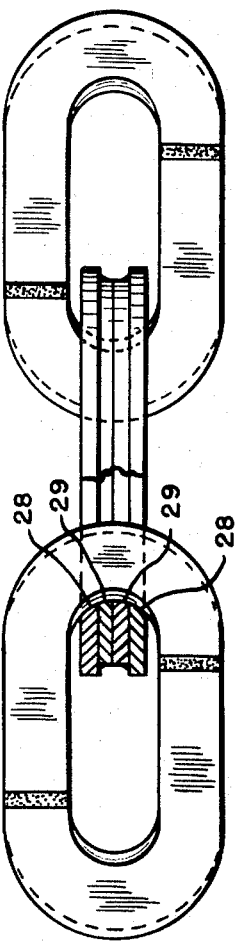

LAMINATED CHAIN LINK CONSTRUCTION

BACKGROUND OF THE INVENTION

Today, chains of the type having a plurality of interlocked links strung out over a predetermined distance are required for various applications wherein the weight-strength ratio of the composite chain is of critical importance. Representative fields of use where the weight-strength ratio is important include heavy earth moving operations, mooring applications and hoisting operations involving the raising and lowering of a hoist line as, for example, from the top of a skyscraper or from a helicopter. In the latter, the hoistline is generally extremely lengthy, and therefore, the weight of the line is of critical importance in determining the ultimate strength of the line.

In order for present day chains to safely withstand the heavy loads typical with these applications, it is necessary to make the chain links of high strength material and of generally massive construction. For instance, in one known construction, the links are constructed of rod stock bent into a suitable closed configuration with the abutting ends of the rod welded together. The joint between the rod ends occupies an entire cross section of the material and any defect in the welded joint will present a plane of weakness in the material of the link. To compensate for this where heavy loads are to be encountered, more massive chains are required. With massive links, however, hardness and strength variations are virtually unavoidable. This is so since in large solid cross sectional links it is not metallurgically possible to heat treat the cross section to a uniform hardness and strength level, the outside always being harder and stronger than the center section.

In another known construction, the individual links are cast. With chains of this construction, however, it is necessary to take care to avoid blow holes, inclusions and other defects which would undesirably affect the strength of the link formed.

SUMMARY OF THE INVENTION

In accordance with the teachings of the present invention, a chain link having a laminated construction is provided. Each layer of the laminated link includes two J-shaped link plates which are joined together at their ends. Advantageously, the joints between the link plates of each layer are arranged in offset relationship with respect to the joints formed between the link plates of every other layer. Thereby any given cross section of a layer of link contains only one joint. With this construction, cross-sectional variation in strength of the link is reduced to an extent such that this variation is not a significant factor affecting the overall strength of the link. With the laminated construction it is possible to attain quite uniform sectional hardness and strength by heat treating the relatively thin sections prior to assembly into links.

The link plates forming one layer of the link are structurally identical to each other and they may also be identical to some or all of the plates forming the other layers of the link. The joints formed between the link plates of each two layers are arranged in offset relationship to each other by placing the two layers in a position such that the long leg of the link plates of one layer are superimposed over the short leg of the link plates of the other layer. Alternatively or in combination therewith, the length of the legs of the J-shaped plates of one layer may be made different from the legs of the plates of the adjacent layers of the link. In either case, an offset distribution of the various joints between the link plates is produced around the body of the link. An advantage of this construction is that the link may be assembled quickly and economically with a minimum number of structurally unlike parts.

In construction, it is advantageous to place the welds of the individual plates in a position of minimum stress, such as in a plane of zero bending moment. This can be done without in any way affecting the overall properties of the link nor adding to processing problems.

With a link having the laminated construction as described above, the link plates may be readily made of clad materials for the purpose of improving corrosion and abrasion resistance. Furthermore, the various link plates comprising the link may be made from wrought material thereby eliminating the presence of blow holes, inclusions and other surface defects possible with cast materials.

The laminated link of this invention may also be equipped with a specially constructed wear plate for protecting the wear portions of the link. These portions include the interlink points of contact of the chain. The use of separate wear plate attachment permits the link itself and the wear plate attachment to be made of different material so that greater interlink wear resistance can be obtained without the necessity of using expensive wear resistant material for the entire link. Of course, the chain link of the present invention can be made without the wear plate attachment. In this case, interlink wear resistance is improved by contouring the wear portions of the link plates to provide smooth engaging surfaces.

BRIEF DESCRIPTION OF THE DRAWINGS

FIG. 6 is a side elevation view, partially broken away, of a chain formed with the laminated links of this invention showing the wear shoe in place on one of the links;

FIG. 7 is a side elevation, partially broken away, of a chain formed with a modified embodiment of the laminated link of this invention; and FIG. 8 is an enlarged view of the wear portion of the laminated links shown in FIG. 7.

DETAILED DESCRIPTION OF THE INVENTION

Figure 1:
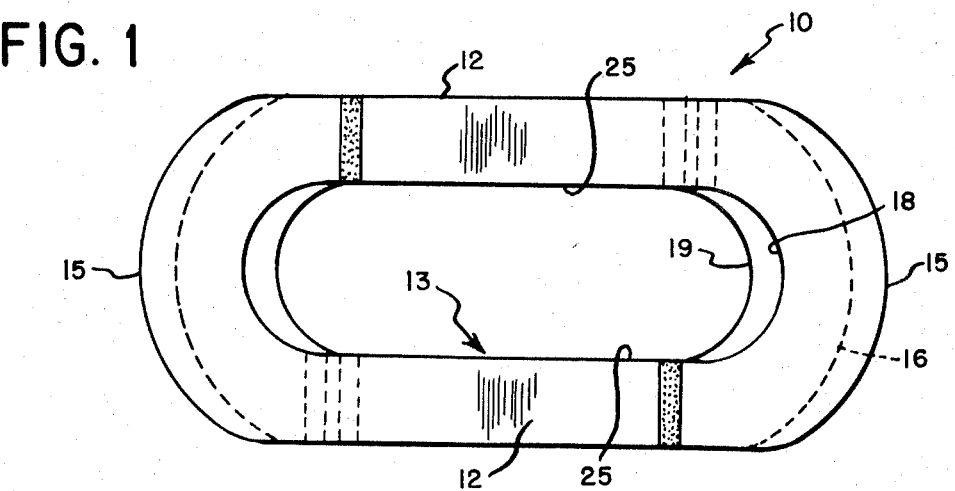
FIG. 1 is a top plan view of the laminated link of this invention.
Figure 2:
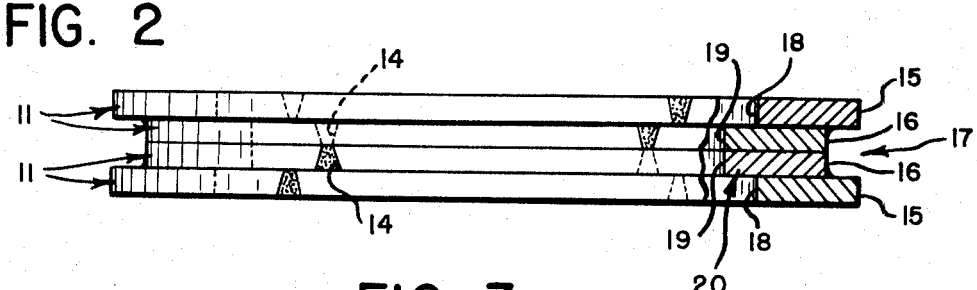
FIG. 2 is a side elevation view of the laminated link of the invention.
Figure 3:
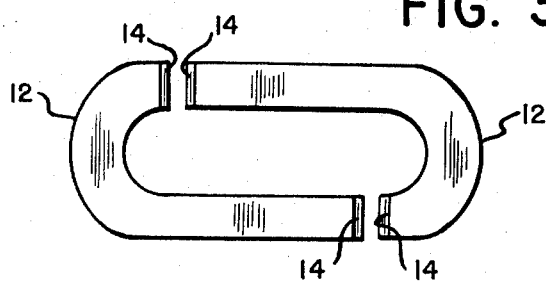
FIG. 3 is a top view of the link plates which make up one of the layers of the laminated link.

As shown in FIGS. 1 and 2, the chain link, indicated generally by reference numeral 10, is comprised of multiple layers 11 each of which includes a plurality of link plates 12 joined securely together to form a composite laminated structure. In the construction shown in the drawings, the link includes a top layer, a bottom layer and two middle layers while each layer includes two link plates of identical J-shape joined together, as by welding, at their ends to form an oblong opening 13 in the link. The terminal ends of each link plate 12 are provided with a beveled surface 14 to provide for the welding material when the ends of one J-shaped plate are positioned in opposing relation to the ends of the other plate of the layer. As shown in FIG. 2, the opposed beveled ends 14 of each pair of link plates 12 are separated slightly to provide a gap therebetween. With the presence of this gap, the welding material is permitted to contact the surface of the link plates defining the adjacent layer thereby uniting adjacent layers of the link together at each weld joint. The J-shaped link plates 12 of each layer are made of wrought metallic material shaped into the desired configuration.

With the described construction, it will be recognized that any points of weakness in the laminated link as caused by the welded joints will be offset with respect to each other. With the four-layer construction shown in the drawings, the joints in each layer are arranged in offset relationship with respect to the joints in every other layer of link. This is done by using J-shaped plates for the top and bottom layers which are identical to each other but which have legs with lengths different from the length of the legs of the plates making up the two middle layers of the link. The plates of the top and bottom layers are then oriented in reverse fashion to each other as are the plates of the two middle layers. Thus, each cross-sectional plane of the link body comprises at least 75 percent unwelded wrought metal and the weld comprises only 25 percent of any cross section. With this arrangement a maximum of 25 percent of the load at those cross sections of the link containing a weld joint is carried by the weld joint as compared to 100 percent of the load being carried by the weld joint when a single weld is made in a solid cross section.

With the construction shown in FIGS. 1 and 2, the rounded outer end portions 15 of the top and bottom layers extend slightly beyond the rounded outer end portions 16 of the middle layers to form recess 17. Similarly, the rounded inner end portions 18 of the top and bottom layers are offset from the rounded inner end portions 19 of the two middle layers. As seen from FIG. 2, the end portions 19 of the middle layers extend inwardly of the inner end portions 18 of the top and bottom layers to form tongues 20.

Figure 5:
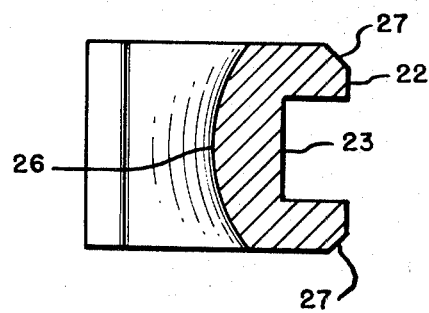
FIG. 5 is a cross-sectional view taken along the line 5—5 of FIG. 4.
Figure 4:
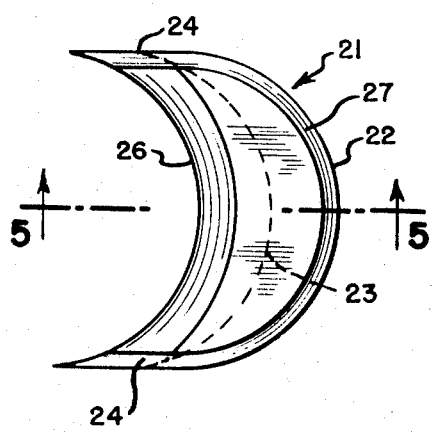
FIG. 4 is a top plan view of the protective shoe used with the laminated link of this invention.

The portions of the laminated link which are subjected to the most wear are the inner end portions of the link where they interlock with the adjacent links of the chain. To protect these portions, the tongues 20, described above, are provided for receiving wear shoes 21. As shown in FIGS. 4 and 5, each protective shoe is provided with a curved face 22 which conforms to inner ends of the link opening and has a groove 23 for mating with the tongue 20. The face 22 of the shoe is curved through an arc of approximately 180° with the end portions 24 tapering off to merge smoothly with the inner side walls 25 of the link. Also, as shown in FIG. 4, the inner face 26 of the shoe 21 is curved in a direction perpendicular to the direction of curvature of the curved face 22 to provide a rounded, contact surface defining the wear portion at each end of the link. The nature of the contact between the curved surfaces 26 of the wear shoes of adjacent links is shown in FIG. 6.

For purposes of providing a strong connection between the wear shoes 21 and the body of the link, each shoe is provided with the beveled surfaces 27. These surfaces together with opposing inner end portions 18 of the plates forming the top and bottom layers of the link define welding cavities similar to those formed between the opposed terminal ends of the link plates.

In FIGS. 7 and 8, there is shown an alternative embodiment of the present invention in which the wear shoes are omitted and the inner end portions of the plates of each layer of the link contoured to form smooth wear surfaces. Thus, with the four-layer link shown in FIGS. 7 and 8, the wear portion 28 of the link plates of the top and bottom layers are fully beveled at an angle of 30° and the wear portion 29 of the link plates of the two middle layers partially beveled at an angle of 15°. As shown most clearly in FIG. 8, this provides a relatively smooth interface between the wear portions of adjacent interlocking links. This, in turn, reduces wear between adjacent links and thereby increases the useful life of the chain.

I claim:

1. A chain link having multiple layers laminated together to form said link, at least two layers of said link each comprising:
    a. a plurality of link plates joined together to form said layer with the joints formed between the link plates of one layer arranged in offset relationship with respect to the joints formed between the link plates of the other layer.

2. The chain link according to claim 1 wherein:
    a. the joints formed between the link plates of each layer are arranged in offset relationship with respect to the joints formed between the link plates of every other layer such that any given cross section of the link contains only a single joint.

3. The chain link according to claim 2 wherein:
    a. at least one link plate of one layer is identical in structure to one link plate of at least one other layer of the link.

4. The chain link according to claim 3 wherein:
    a. each of the link plates of one layer are identical to each of the link plates of at least one other layer.

5. The chain link according to claim 4 wherein:
    a. each layer of the link is comprised of two J-shaped link plates.

6. A chain link according to claim 5 wherein:
    a. the opposed ends of the J-shaped link plates of each layer are spaced from each other to define with the thereby exposed surface of the link plate of an adjacent layer a channel for receiving bonding material; and including
    b. a bonding material occupying said channel to join the link plates of one layer together and to join those plates of an adjacent layer of the link.

7. The chain link according to claim 5 wherein:
    a. the inner end portions of each link have a rounded configuration to reduce wear due to contact with an adjacent interlocking link of a chain.

8. The chain link according to claim 5 including:
    a. a rounded wear shoe attached to each inner end portion of the link to reduce wear due to contact with the adjacent interlocking link of a chain.

9. The chain link according to claim 8 wherein:
    a. the link includes:
        1. a top layer,
        2. a bottom layer,
        3. at least one middle layer positioned between the top and bottom layers at least one of said middle layers projecting into the link opening to form an inwardly protruding tongue extending along the inner end portions of link; and b. the wear shoe includes a groove mating with said tongue for positioning said shoe.

10. The chain link according to claim 9 including:
a. two middle layers each of which is comprised of link plates having identical structure, said two middle layers both projecting into the link opening to form said tongue.

* * * * *